Patented Jan. 22, 1952

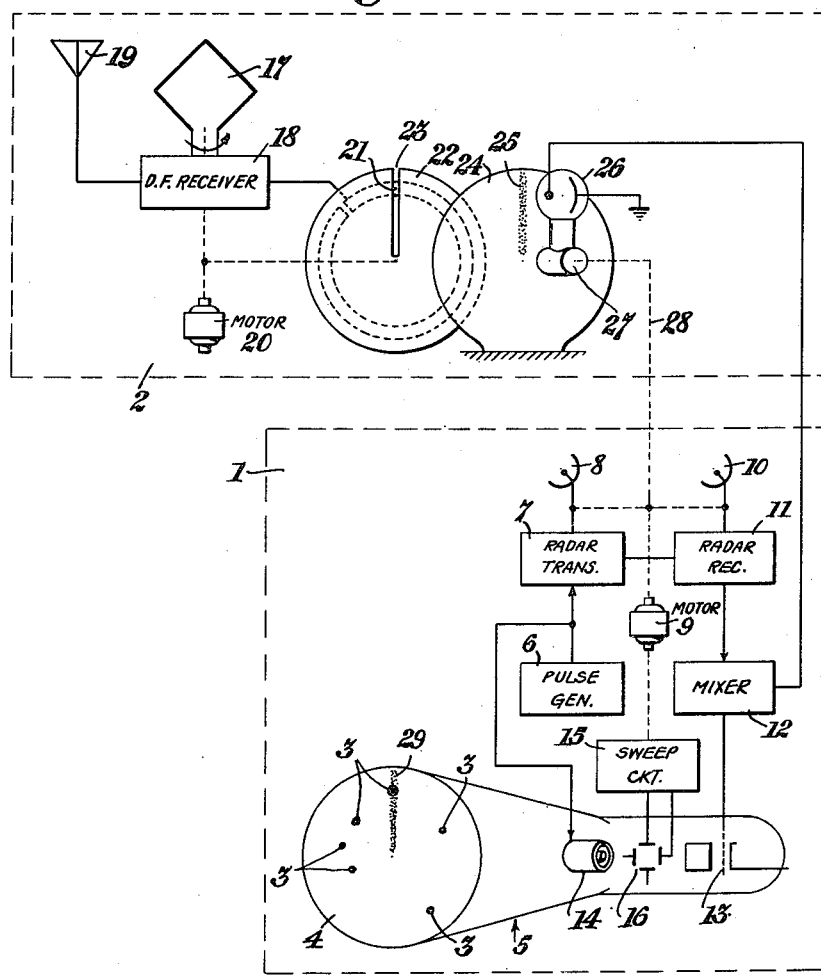

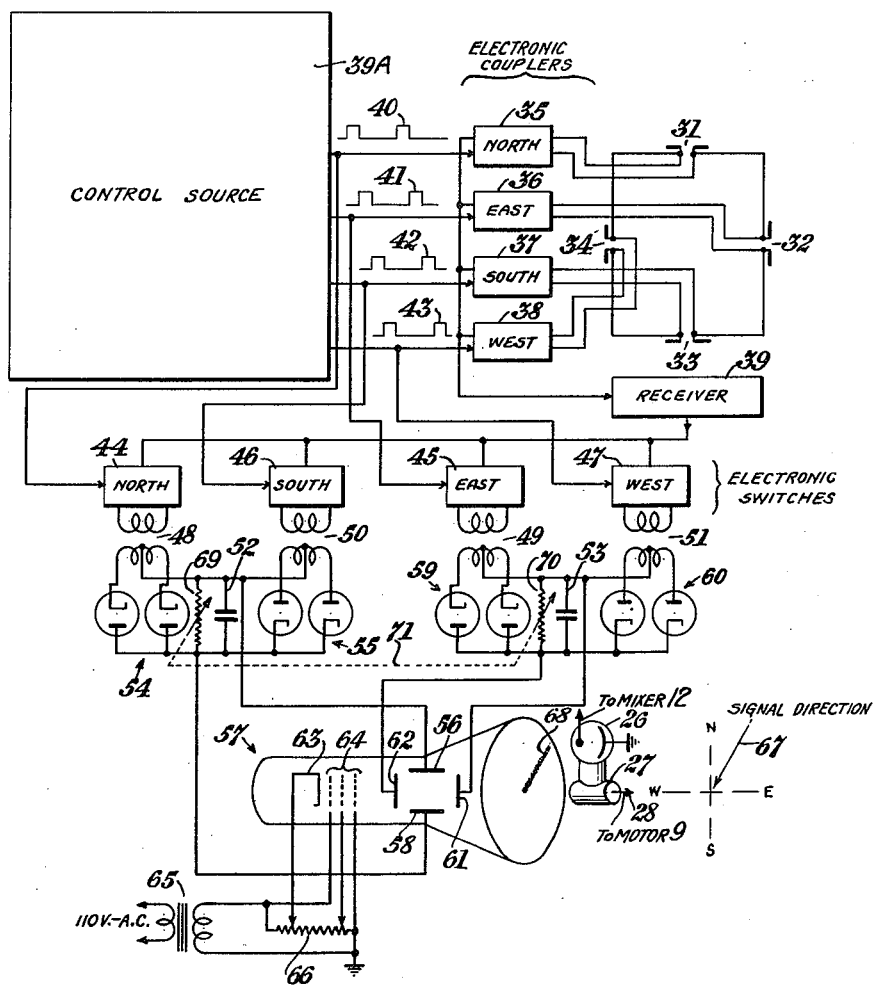

2,582,962

UNITED STATES PATENT OFFICE 2,582,962

DIRECTION AND POSITION INDICATING SYSTEM

Gordon S. Burroughs, Forest Hills, N. Y., assignor, by mesne assignments, to International Standard Electric Corporation, New York, N. Y., a corporation of Delaware Application July 10, 1946, Serial No. 682,611

5 Claims. (Cl. 343—6)

This invention relates to direction and position indicating systems, particularly those combining radar and direction finding.

In certain types of position indicating systems, it is important to identify the various objects indicated on the usual indicating device. For example, in certain aircraft landing systems of the ground-controlled radar type, it is desirable to know which dot on the radar screen represents the aircraft with which communication is being had. Since, for military purposes, it is usually desirable that the aircraft only engage in brief transmissions, so that it will not be readily detected, it is necessary that such information be obtained rapidly. For this purpose, it is possible to use a direction finding system of the instantaneous indication type which rotates at a rapid speed. For known reasons, however, the antenna system of the radar must rotate relatively slowly. If, therefore, the transmission is brief, it might be finished before the beam tracing the radar pattern reaches the position to indicate the particular aircraft. On the other hand, if the transmission is continuous, there will still be only a few points where the direction finding and radar scanning will be coincident. Consequently, it is impractical to simply connect the direction finder and radar to the same cathode ray tube.

An object of the present invention is the provision of an improved direction and position-indicating system.

Another object of the present invention is the provision of a position-indicating system providing means for separately identifying the objects indicated.

Another object of the present invention is the provision of a position-indicating system further providing means for indicating which of the objects whose positions are indicated, is transmitting. A feature of the foregoing is that the direction of the particular object, as for example an aircraft which is transmitting, is indicated on the screen of the cathode ray oscilloscope which also provides for radar indications.

Other and further objects of the present invention will become apparent and the invention will be best understood from the following description of embodiments thereof, reference being had to the drawings, in which:

Fig. 1 is a block and schematic diagram of one system embodying my invention; and Fig. 2 is a portion of a system showing a modification of the system of Fig. 1.

The system illustrated in Fig. 1 may be divided generally in two parts consisting of a radar arrangement 1 and a direction finder 2. The radar arrangement 1 serves to produce indications 3 in the form of dots of light on the screen 4 of a cathode ray tube 5, which indications are arranged about the center of the screen in positions corresponding to the positions of the objects detected about the central station. In general, the radar equipment is conventional and may include the usual pulse generator 6, radar transmitter 7 and directional antenna 8, which is rotated by means of a suitable motor 9 in synchronism with the receiving antenna 10. The receiving antenna 10 feeds the usual radar receiver 11 whose output in turn is fed through a mixer 12 to the control or intensifier grid 13 of cathode ray tube 5. Each time the pulse generator 6 generates a pulse for transmission by the directional antenna 8, this pulse is likewise applied to a deflection cylinder 14 to produce a radial deflection of the beam in cathode ray tube 5, which beam is normally rotated by means of voltages from the sweep circuit 15, which are applied to the horizontal and vertical deflection plates 16, the sweep circuit 15 in turn being synchronized with motor 9. When the transmitted pulse is reflected by an object, it is received on the receiving antenna 10 and applied through mixer 12 to the intensifier grid 13, thereby illuminating tube 5 at a given time during the radial deflection of the beam in the tube from the center. It thereby produces a spot or dot 3 corresponding to the position of the object, and at a distance from the center of the screen corresponding to the distance of the object from the radar station. The radar antennas 8 and 10 rotate very slowly and as they rotate, various indications 3 are produced on the screen 4 of tube 5.

In certain aircraft landing systems, communication is had with aircraft around the station and it is desired to know with which aircraft communication is being had. The communication may be had by means of transmitting and receiving equipment (not shown in the drawing). In order to learn which of the aircraft about the station is conversing with the operator, use may be made of the direction finder 2. In the main, direction finder 2 is conventional in design and may for example, include a rotating loop 17, feeding a direction finding receiver 18, which is likewise fed by a sensing antenna arrangement 19. The loop 17 may be rotated by a motor 20 which rotates at a relatively high speed, considerably greater in speed than the speed of rotation of radar antennas 8 and 10. The output of the direction finding receiver 18 is fed to any suitable indicating device which may for example, be of the type described in the co-pending application of A. G. Richardson–A. G. Everhart— 15-2, for "Direction Finder," Serial No. 583,502, filed March 19, 1945, Patent No. 2,468,109, granted April 26, 1949, and may consist of a neon flash lamp 21 which is illuminated periodically by the direction finding receiver whenever signals are being received from the transmitting aircraft as the loop antenna 17 rotates. In front of the neon lamp 21, there is provided a rotating masking disk 22 having a slot or aperture 23 provided therein. The disk 22 is rotated at the same speed as the loop antenna 17 and for this purpose may also be controlled by motor 20. Each time the lamp 21 flashes, the slot 23 is at a position corresponding to the position of the object from the loop antenna 17. Consequently, the effect is to produce a radial line of light in front of the disk which corresponds to the direction of the object from the receiver.

In accordance with the present invention, this line of light is in the form of energy which is stored and thereafter scanned to produce an effect on the screen 4 of the cathode ray tube 5. For this purpose, I prefer to arrange in front of the disk 22, a plate 24 of phosphorescent material. The phosphorescent material is preferably of the type which has relatively long persistence such as certain forms of zinc, cadmium, sulphide plus a suitable activator. A line 25 of excited luminous material is thereby produced on the plate 24 which line of light 25 persists for a predetermined time, depending upon the material selected and which time may also be controlled by infra-red radiation to give a more rapid decay of the luminosity of the material.

The energy represented by the excitation along the line 25 of the phosphorescent material on plate 24 is scanned at a speed corresponding to the rate of rotation of the beam in cathode ray tube 5. For this purpose, use may be made of a photo-electric cell 26 which is mounted for rotation on a member 27 pivoted at a point corresponding to the center of disk 22 and plate 24. The member 27 is rotated at a speed determined by motor 9, as is indicated by line 28, it being remembered that motor 9 in turn controls the sweep circuit 15 and therefore the rate of rotation of the beam in cathode ray tube 5. The photo-electric cell 26 is rotated at the same rate of speed as the beam in cathode ray tube 5. The output of said cell is applied through the mixer 12 to illuminate the cathode ray tube 5. Consequently a visible line 29 is produced on the screen 4 of the cathode ray tube 5 indicating the direction from which transmission is being received. This line will pass through that one of the indications 3 which represents the object which is transmitting at a given moment. Consequently, the operator of this system is apprised as to which of the objects is communicating with him.

While I have illustrated the application of my invention to one type of direction finding receiver having one type of indicating system, it will be apparent that it may be employed with different types of receivers and with different types of indicating systems as is, for example, illustrated in the modification Fig. 2.

Referring now to Fig. 2, the antenna system there illustrated includes four differently directed unidirectional antennas 31, 32, 33 and 34 respectively, which may be in the form of horizontal dipoles directed as for example, north, east, south and west respectively by arranging said antennas in front of respective reflectors. Antennas 31 and 33, and antennas 32 and 34 form pairs of oppositely spaced units, with pairs 31 and 33 in a line substantially at right angles to pairs 32 and 34.

Antennas 31—34 are sequentially coupled through electronic couplers 35—38 respectively to a receiver 39. This may be accomplished by sequentially unblocking couplers 35—38 by applying thereto voltages from a suitable rectangular wave generating control source 39A. The control source 39 applies unblocking voltages sequentially to couplers 35 through 38 as indicated by wave forms 40 to 43, thus sequentially coupling antennas 31 through 34 to the receiver 39.

Energy from antennas 31—34 is amplified in receiver 39 and then fed in parallel to the inputs of four electronic switches 44, 45, 46 and 47, which sequentially unblock said switches, in their numerical order, in synchronism with the unblocking of corresponding electronic couplers 35—38 respectively. The outputs of electronic switches 44—47 are coupled to the primaries of transformers 48—51 so that energy derived from antennas 31—34 is sequentially respectively applied to transformers 48—51. The signal energy derived from electronic switches 44—47 is used to charge condensers, the charge on the condensers then being applied to the deflection plates of a cathode ray oscillograph tube, so that a directional indication will be obtained as long as the charge persists on the condensers. Adjustable means is provided for adjusting the time of discharge of said condensers so that the indication will endure for as long a period as desired. Two condensers 52 and 53 are employed, each of which condensers is charged in opposite directions depending on the direction from which the signal is being received, with each condenser connected across opposite deflection plates, as for example, condenser 52 being coupled to the vertical deflection plates and condenser 53 being coupled to the horizontal deflection plates with the direction of the charge determining whether the spot will be deflected toward the north or south, or toward the east or west as viewed on the screen of said tube.

For the aforementioned purpose, electronic switches 44 and 46 which are coupled sequentially to the antennas 31 and 33, being the northerly directed antenna and southerly directed antenna respectively, have the secondary of their associated transformers 48 and 50 respectively connected through pairs 54 and 55 respectively of full wave rectifying tubes to condenser 52 with rectifiers 54 charging the upper plate of condenser 52 positively while the rectifiers 55 charge said upper plate negatively. The upper plate of condenser 52 is coupled to the upper plate 56 of the vertically deflecting plates of a cathode ray oscillograph tube 57 while the lower plate of condenser 52 is coupled to the lower plate 58 of said vertically deflecting plates.

A similar arrangement is used in connection with the electronic switches 45 and 47 which transmit energy derived respectively from antennas 32 and 34 which are eastwardly and westwardly directed respectively. The output of transformer 49 is rectified in full wave rectifiers 59 and applied to charge the upper plate of condenser 53 positively while the output of transformer 51 is rectified in full wave rectifiers 60 and applied to condenser 53 to charge the upper plate thereof negatively. The upper plate of condenser 53 is coupled to the right or easterly plate 61 of the horizontally deflecting plates of cathode ray oscillograph tube 57 while the bottom plate of condenser 53 is applied to the left or westerly plate 62 of the horizontally deflecting plates.

The cathode ray oscillograph tube 57 includes the usual cathode 63 and beam-directing or accelerating electrodes or anodes 64. Usually such electrodes are supplied with D. C. potential but for the purpose of changing the spot, whose deflection from the center of the screen indicates the line of direction from which energy is being received, into a radial line extending to the edge of the screen and for economy and the elimination of a high voltage rectifier and filter, I prefer to use raw A. C. current for applying the potential to these electrodes. For this purpose, a step-up transformer 65 has its primary connected to a line source of A. C. potential, the secondary of said transformer being shunted by a voltage divider 66, various points on which are connected to the various electrodes. In addition to the connections here shown, centering means for the spot may also be provided.

Assuming that a signal is arriving at the antenna system from a northeasterly direction, energy will be picked up on antennas 31 and 32 which are oriented northerly and easterly respectively. This energy is then fed through electronic couplers 35 and 36 to the receiver and switched through electronic switches 44 and 45 to charge condensers 52 and 53 so that their upper plates are positive. The condensers then deflect the spot in a northeasterly direction as viewed on the screen of the cathode ray oscillograph tube. However, due to the fact that the accelerating potentials applied to the beam vary in accordance with the alternations of the raw current supply, the "stiffness" or resistance of the beam to deflection will vary and consequently the indication produced instead of being a mere spot, will be a radial line 68 as illustrated in Fig. 2. Since the signal is coming from a northeasterly direction, the antenna units 33 and 34 will pick up no energy because of their orientation and there will be no tendency to charge the condensers 52 and 53 in a direction opposite to that which they were charged in the foregoing operation.

The indication of the directional indication produced on the screen of the cathode ray oscillograph tube will remain there until condensers 52 and 53 are discharged. For the discharge of condensers 52 and 53, a pair of resistors 69 and 70 are arranged in shunt across said condensers, said resistors being variable and preferably ganged together as indicated by the dotted line 71 so that by a single adjustment the time of persistence of the indication may be controlled. Thus for example, an operator need not continuously observe his apparatus but may leave it for short time intervals knowing that if any directional signal is picked up it will be indicated on the cathode ray oscillograph screen upon his return. If it is desired to remove the indication sooner than would normally occur through leakage, the operator may discharge the condenser by adjustment of the resistors 69 and 70.

The foregoing system is more fully described in the co-pending application, Gordon S. Burroughs, for "Direction Finding System," Serial No. 626,129, filed November 1, 1945, now abandoned, and reference is made to said application for further details.

The cathode ray tube 57 is preferably one of long persistence and by providing a suitable screen, the photo-electric cell 26, which may be arranged in front thereof in a manner similar to that in which it is arranged in Fig. 1 in front of plate 24, will scan the screen at the rate of rotation of the radar antenna system, since it is controlled by motor 9 as has been explained hereinbefore.

It will be apparent to those versed in the art that numerous changes may be made in the systems described without departing from the teachings of the present invention. For example, different types of direction finding systems may be employed in place of one shown. Furthermore, other types of radar arrangements may also be substituted. It will be likewise obvious that instead of rotating a photo-electric cell, the cell may be stationary and a suitable optical system may be rotated to scan the plate 24 or screen 69. This may be, for example, a rotated dove-prism.

Numerous other changes will be apparent from the foregoing. Accordingly, while I have described above the principles of my invention in connection with specific apparatus, and particular modifications thereof, it is to be clearly understood that this description is made only by way of example and not as a limitation on the scope of my invention.

I claim:

1. In a system for indicating the position of objects about a given location, a radar arrangement including means for radiating pulses and receiving reflected pulses from a given direction, means for varying said direction at a relatively slow rate of speed, a cathode ray tube, and means responsive to the reflected pulses for producing indications on the screen of said tube corresponding in position to the position of said objects about the given location; a direction finder comprising means for receiving signals from a given direction, means for effectively varying at a relatively rapid rate the sensitivity of reception with direction, means responsive to the received signals for producing an effect characterizing the direction from which said signals are being received; means responsive to said effect for selecting the indication on said screen corresponding to the object from which signals are being received, and means for combining the said received radar and direction finding signals.

2. A system according to claim 1 wherein in said radar arrangement said direction is varied cyclically, and said means for selecting the indication on said screen includes means for scanning said effect at a repetition rate substantially equal to the cyclical rate at which said last-mentioned direction is varied.

3. A system according to claim 1 wherein said means for radiating and receiving pulses includes directional antenna systems adapted to be effectively rotated, said means for producing an effect includes a member adapted to be illuminated along a radial line corresponding to the direction from which signals are being received said member having an illuminous persistency at least equal to the time required to make a complete rotation of said antennas, and said means for selecting the indication includes photo-electric means arranged to receive light from said member and adapted to scan said member at a rate equal to the rate of rotation of said antennas.

4. A system according to claim 1 wherein said radiating and receiving means includes an antenna system adapted to be rotated at a relatively slow rate of speed, said means for producing an effect includes a light and a mask arranged in front of said light having a slit therein, said light being adapted to be turned on in response to received signals, and said mask rotating at a relatively rapid rate of speed, a fluorescent screen arranged in front of said mask and adapted to be illuminated by the light passing through said slit, and said means for selecting the indication comprises a photo-electric member adapted to be directed at said fluorescent screen and mounted for rotation relative to the surface thereof, and means for rotating said photo-electric member at said relatively slow rate of speed.

5. In a system for indicating the position of objects about a given location, a radar arrangement including means for radiating pulses and receiving reflected pulses including an antenna system adapted to be rotated to change the direction of propagation of said pulses, means for rotating said antenna system at a relatively slow rate of speed, a cathode ray tube, means responsive to the reflected pulses for producing indications on the screen of said tube corresponding in position to the position of said objects about the given location; a direction finder comprising means for receiving signals including an effectively rotatable antenna system, means for effectively rotating said antenna system at a relatively rapid rate, a second cathode ray tube, means responsive to the received signals for producing a radial trace on the screen of said second tube corresponding to the direction from which said signals are being received; and photo-electric means directed at the screen of said second tube and adapted to circularly scan the surface thereof at a rate of speed corresponding to the rate of rotation of the antenna system of the radar arrangement, and means responsive to the voltages developed by said photo-electric tube for producing a linear deflection in said first-mentioned cathode ray tube corresponding in direction to the direction from which signals are being received and designating the specific indication on said screen corresponding to the object from which said signals are being received.

GORDON S. BURROUGHS.

REFERENCES CITED

The following references are of record in the file of this patent:

UNITED STATES PATENTS

| Number | Name | Date |
|---|---|---|
| 2,208,376 | Luck | July 16, 1940 |
| 2,226,860 | Grieg | Dec. 31, 1940 |
| 2,252,083 | Luck | Aug. 12, 1941 |
| 2,405,231 | Newhouse | Aug. 6, 1946 |
| 2,426,217 | Hoisington | Aug. 26, 1947 |

FOREIGN PATENTS

| Number | Country | Date |
|---|---|---|
| 116,667 | Australia | Oct. 10, 1941 |